United States Patent [19]

Furukawa

[11] Patent Number: 5,757,605
[45] Date of Patent: May 26, 1998

[54] PULSE-WIDTH MODULATION CONTROL SYSTEM FOR MULTIPLE SOLENOIDS UTILIZING A SINGLE A/D CONVERTER IN WHICH THE A/D CONVERSION TIME IS USED TO CONTROL THE SEQUENTIAL OPERATION OF THE SOLENOIDS

[75] Inventor: Hideo Furukawa, Wako, Japan

[73] Assignee: Honda Giken Kogyo Kabushiki Kaisha, Tokyo, Japan

[21] Appl. No.: 609,940

[22] Filed: Feb. 29, 1996

[30] Foreign Application Priority Data

Mar. 2, 1995 [JP] Japan ................... 7-068760

[51] Int. Cl.$^6$ .................... H01H 47/00; H01H 47/32
[52] U.S. Cl. .................... 361/154; 361/191
[58] Field of Search ............... 361/191, 152, 361/153, 154, 166, 167, 168.1, 169.1

[56] References Cited

U.S. PATENT DOCUMENTS 5,202,813  4/1993  Uota et al. ................. 361/154
5,461,563  10/1995 Mimura ..................... 361/152

FOREIGN PATENT DOCUMENTS 2-300556  12/1990  Japan.
3-153980   7/1991  Japan.
3-199757   8/1991  Japan.
4-50550    2/1992  Japan.
7-68761    2/1996  Japan.

*Primary Examiner*—Brian K. Young
*Assistant Examiner*—Thuy-Trang N. Huynh
*Attorney, Agent, or Firm*—Armstrong, Westerman, Hattori, McLeland & Naughton

[57] ABSTRACT

A pulse-width modulation control system having a power source, driver circuits connected to the power source, and two solenoids, such as those for a vehicle automatic transmission, connected to the power source through the driver circuits, and pulse trains of a predetermined PWM duty ratio are supplied. The supplied currents are detected and A-D converted. In the system, one pulse train lags behind the other at the leading edge. When PWM controls two solenoids at the same time using an on-board microcomputer, two voltage memory circuits are additionally needed, since the microcomputer ordinarily has only one A-D converter. With the arrangement, only one voltage memory circuit is needed, rendering the system configuration simple.

4 Claims, 7 Drawing Sheets

PULSE-WIDTH MODULATION CONTROL SYSTEM FOR MULTIPLE SOLENOIDS UTILIZING A SINGLE A/D CONVERTER IN WHICH THE A/D CONVERSION TIME IS USED TO CONTROL THE SEQUENTIAL OPERATION OF THE SOLENOIDS

BACKGROUND OF THE INVENTION

1. Field of the Invention

This invention relates to a pulse-width modulation (PWM) control system for an electronic device, more particularly to such a control system which proposes an improved A-D conversion of the detected current supply for the pulse-width modulation control.

2. Description of the Related Art

As taught by Japanese Laid-Open Patent Application Nos. Hei 3(1991)-199757, Hei 3(1991)-153980, Hei 4(1992)-50550 and Hei 2(1990)-300556, for example, it is a common practice to detect the current flow through an electronic device such as a linear solenoid used in the hydraulic circuit of a vehicle transmission and perform control by pulse-width modulation or pulse-duration modulation based on the detected current flow.

Moreover, it has been proposed to provide two linear solenoids in the vehicle automatic transmission control. FIG. 8 shows duty pulse trains A, B of the duty ratio in the PWM control to be applied to both solenoids through driver circuits. In this case, it is necessary to read instantaneous current at each turning point, i.e., at each rise point (leading edge) and fall point (trailing edge) of the pulses. When PWM controlling two solenoids at the same time using an on-board microcomputer, two voltage memory circuits are additionally needed, since the microcomputer ordinarily has only one A-D converter.

SUMMARY OF THE INVENTION

An object of this invention is therefore to overcome the aforesaid problem of the prior art by providing a pulse-width modulation control system for an electronic device using an on-board microcomputer for PWM controlling at least two devices with one A-D converter, which can decrease the number of additional voltage memory circuits to the least when detecting the supply of current to the devices for conducting the PWM control of the devices.

Moreover, the on-board microcomputer has sensors including those for detecting current supplied to the devices through driver circuits, and receives their outputs successively for A-D conversion. Detection of the current supply to the solenoids makes it necessary to activate the A-D converter each time, rendering the A-D conversion complex and tedious.

A second object of this invention is therefore to overcome the aforesaid problem of the prior art by providing a pulse-width modulation control system for an electronic device using an on-board microcomputer for PWM controlling at least two devices with one A-D converter, which can make the A-D conversion in a simpler manner, thereby facilitating the PWM control of the devices.

This invention achieves this object by providing a pulse-width modulation control system, comprising a power source, driver circuits connected to the power source, at least two solenoids connected to the power source through the driver circuits, pulse supplying means to supply two pulse commands having a duty ratio to the driver circuits to cause the driver circuits to supply currents to the solenoids from the power source, current detecting means for detecting analog values indicative of the currents supplied to the two solenoids respectively, correcting means for correcting said pulse commands based on a result obtained by comparing the detected current with the current value corresponding to said pulse command and a single A-D converter for A-D converting the detected analog values. In the system, timing controlling means for controlling the two solenoids to operate at a different timing.

BRIEF EXPLANATION OF THE DRAWINGS

This and other objects and advantages of the invention will be more apparent from the following description and drawings, in which:

FIG. 4(b) is an enlarged view of the circled portion of FIG. 4(a);

DETAILED DESCRIPTION OF THE PREFERRED EMBODIMENTS

An embodiment of the invention will now be explained with reference to the attached drawings.

Figure 1:
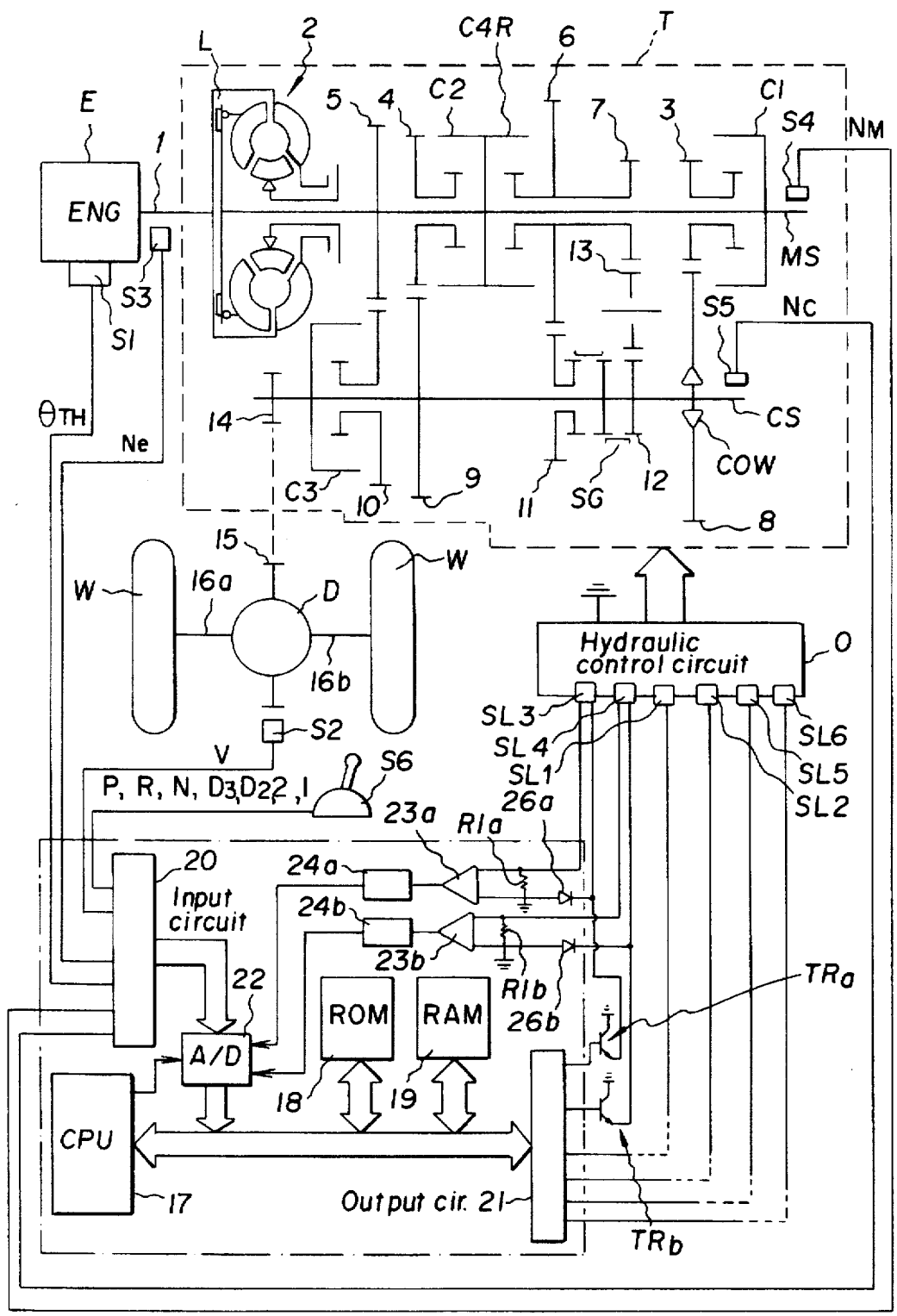
FIG. 1 is an overall view of the pulse-width modulation control system for an electronic device applied in a vehicle automatic transmission.

FIG. 1 is an overall view of the pulse-width control system for an electronic device according to the invention taking as an example an application in a control system for a hydraulically operated vehicle transmission.

As shown in FIG. 1, a vehicle automatic transmission T is equipped with a main shaft MS connected with the crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second to fourth gears, the counter first-speed gear 8 is supported by a one-way clutch COW.

The second gear is established when the main second-speed gear 4 rotatably supported on the main shaft MS is connected with the main shaft MS by a second-speed hydraulic clutch C2. The third gear is established when the counter third-speed gear 10 rotatably supported on countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R.

The reverse gear is established when the counter reverse gear 12 rotatably supported on the counter-shaft CS is connected with the countershaft CS by the selector gear SG and with this state maintained the main reverse gear 7 rotatably supported on the main shaft MS is connected with the main shaft MS by the fourth-speed reverse hydraulic clutch C4R.

The rotation of the countershaft CS is transmitted through a final drive gear 14 and a final drive gear 15 to a differential D, from where it is transmitted to drive wheels W, W through left and right drive shafts 16a, 16b.

A throttle position sensor S1 is provided in the air intake pipe (not shown) of the engine E at a point in the vicinity of a throttle valve (not shown) for detecting the degree of opening θTH of the throttle valve. A vehicle speed sensor S2 for detecting the vehicle speed V from the rotational speed of the final driven gear 15 is provided in the vicinity of the final driven gear 15. A crank angle sensor S3 is provided in the vicinity of the crankshaft 1 for detecting the engine speed Ne from the rotation of the crankshaft 1.

An input shaft rotational speed sensor S4 is provided in the vicinity of the main shaft MS for detecting the rotational speed NM of the transmission input shaft from the rotation of the main shaft MS, and an output shaft rotational speed sensor S5 is provided in the vicinity of the countershaft CS for detecting the rotational speed NC of the transmission output shaft from the rotation of the countershaft CS. A shift lever position sensor S6 is provided in the vicinity of a shift lever (not shown) installed on the vehicle floor near the driver's seat. The shift lever position sensor S6 detects which of the seven positions P, R, N, D4, D3, 2 and 1 has been selected by the driver.

Outputs of the sensors S1, etc., are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The outputs of the sensors Si, etc., are input to the microcomputer through the input circuit 20. The analog outputs are converted into digital values through an A-D converter 22 and are stored in the RAM 19, while the digital outputs of the sensors are subject to processing in a circuit such as a wave shaper (not shown) and are stored in the RAM 19. The CPU 17 handles a word size of 8/16 bits by capacity number (8 bits for external bus and 16 bits for internal bus).

The CPU 17 of the microcomputer determines the gear (gear ratio) to be shifted and energizes/deenergizes shift solenoids SL1, SL2 of a hydraulic control circuit O via the output circuit 21 so as to switch shift valves (not shown), thereby engaging/disengaging the hydraulic clutches of the gears concerned, while supplying current to linear solenoids SL3, SL4 to regulate the clutch hydraulic (oil) pressure. The linear solenoids operate to supply oil to the clutches in such a manner that the oil pressure is inversely proportional to the supplied current.

More specifically, the CPU 17 detects the current flow supplied to the solenoids SL3, SL4 in the manner explained below and PWM controls such that the control error between the detected value and the desired value decreases. In the figure, reference numeral SL5 denotes a solenoid for controlling the lockup clutch L of the torque converter 2 in locked-on/off states, and SL6 denotes a solenoid for controlling the lockup clutch in a slip state between the two states.

Figure 2:
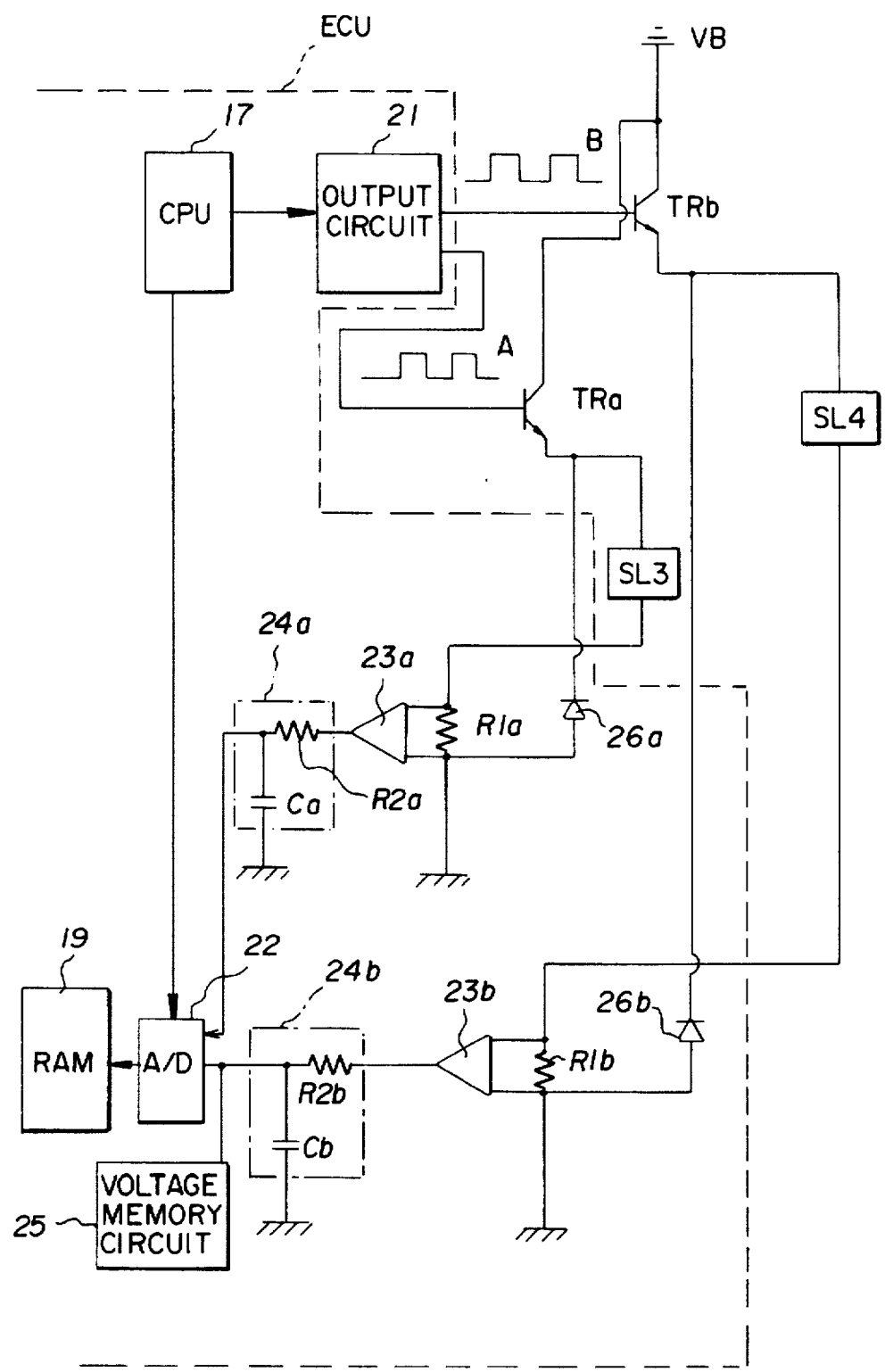
FIG. 2 is a block diagram showing the operation of the ECU illustrated in FIG. 1.

FIG. 2 is a block diagram functionally illustrating the operation of the ECU. The CPU 17 executes a routine (not shown) in accordance with instructions stored in the ROM 18 for determining command values to be sent to the linear solenoids SL3, SL4 in terms of pulse trains having a variable duty ratio, and supplies drive (duty) pulses to driver circuits respectively comprising transistors TRa, TRb, i.e., to the base terminal of NPN transistors TRa, TRb through the output circuit 21.

Transistors TRa, TRb are connected with the power source and are supplied with the power source voltage VB (12 V) of an on-board battery (not shown) and turns on in response to the supplied pulses to pass current through the linear solenoids SL3, SL4. Resistors R1a, R1b are inserted in the current path on the opposite side of the linear solenoids SL3, SL4 from the transistor TRa, Trb. The voltage across the respective resistors R1a, R1b which is proportional to the current flow, is input to operational amplifiers 23a, 23b for amplification. The output of the operational amplifiers 23a, 23b are applied to the A-D converter 22 through respective filter circuits 24a, 24b, are constituted of a resistor R2a, R2b and a capacitor Ca, Cb.

The CPU 17 activates the A-D converter 22 at prescribed intervals for fetching the input value and converting it to a digital value, as will be explained later. Only a single voltage memory circuit 25 is provided downstream of the filter 24b for a case in which the number of analog sources is large. The converted value is stored in the RAM 19. The CPU 17 converts the input value to a current value in accordance with an appropriate conversion characteristic and multiplies the control error between the converted current value and the desired current value by a feedback gain calculated based on a PID (Proportional, Integral and Derivative) control law or the like to correct the command value. Reference numerals 26a, 26b designate a flywheel diodes for producing a counter electromotive force.

An explanation will now be given regarding the operation of the control system according to the embodiment.

Figure 3:
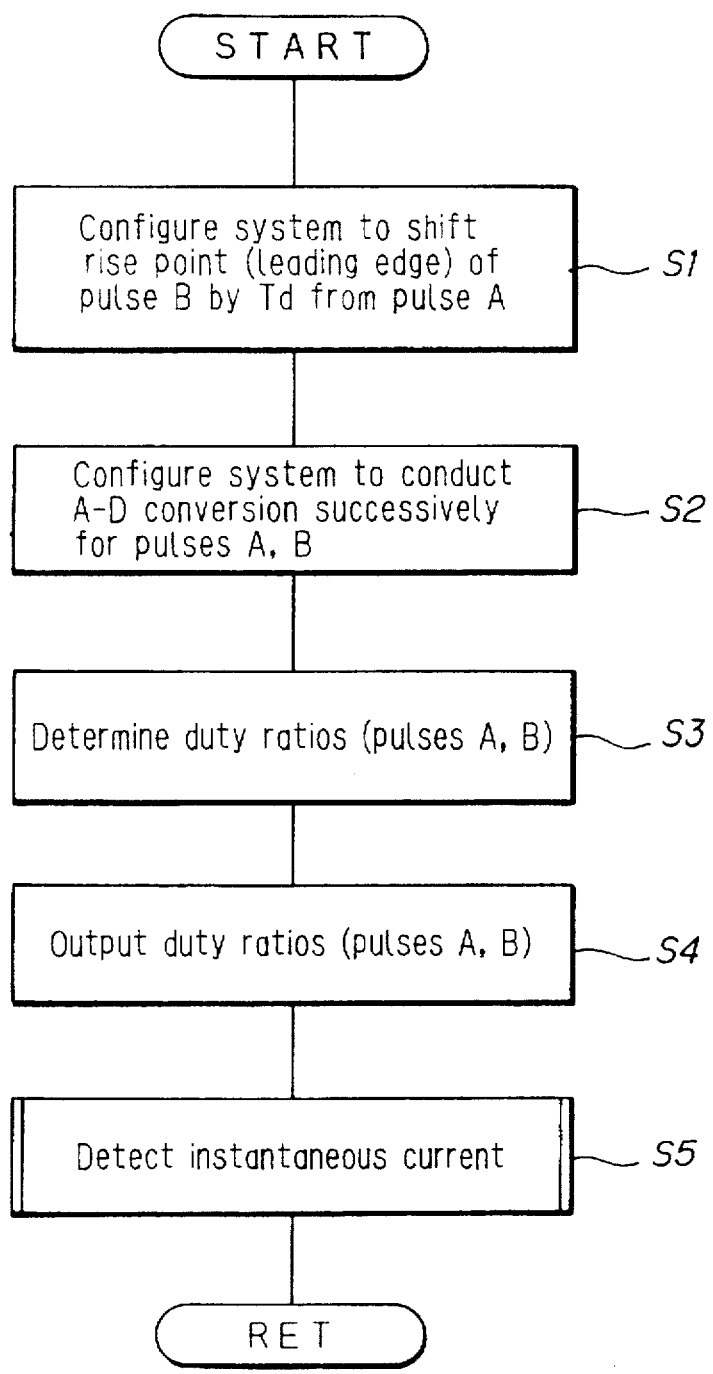
FIG. 3 is a flowchart showing the operation of the system according to the invention.

FIG. 3 is a flowchart showing the operation of the control system and FIGS. 4a and 4b are timing charts for explaining the operation where FIG. 4(b) is an enlarged view of the encircled portion of FIG. 4(a).

First, in S1, the system is configured such that the rise point (leading edge) of the pulses in the pulse train B is shifted by a time (time lag or timing) Td from that of the pulse train A. As referred to earlier, the pulse trains A, B are pulses indicative of the duty ratio (command) for driving the linear solenoids SL3 and SL4. Of the pulse trains, B is shifted by the lag time Td to A at their rise point, in other words, they are driven to operate at a different timing.

Explaining this with reference to FIG. 4b, the processing at the A-D converter 22 is divided into fetching or reading a detected value and converting it into a digital value. It takes 0.01 ms for fetching and 0.02 ms for A-D conversion. The A-D conversion requires 0.03 ms in total. Taking the account in view, the system is configured such that the time lag is generated between pulse trains. More specifically, the time lag Td is set to be 0.03 ms. Thus, it is configured such that the solenoids are driven sequentially with the time lag Td.

The program next goes to S2 in which the system is configured such that the A-D conversion should be done in a sequential manner and the A-D conversion of the detected values corresponding to the pulses A, B should be carried out consecutively. In other words, the system is configured such that the detected analog value for the pulse B should be converted into a digital value immediately after the conversion of that for pulse A has been completed.

The program then proceeds to S3 in which the (drive) duty ratio (on duration/on and off durations) are determined, i.e., the pulses A, B are determined respectively for the solenoids SL3, SL4. The program then proceeds to S4 in which the duty ratios (pulses A, B) are output in the manner mentioned above, and to S5 in which the instantaneous currents supplied to the solenoids are detected.

Figure 5:
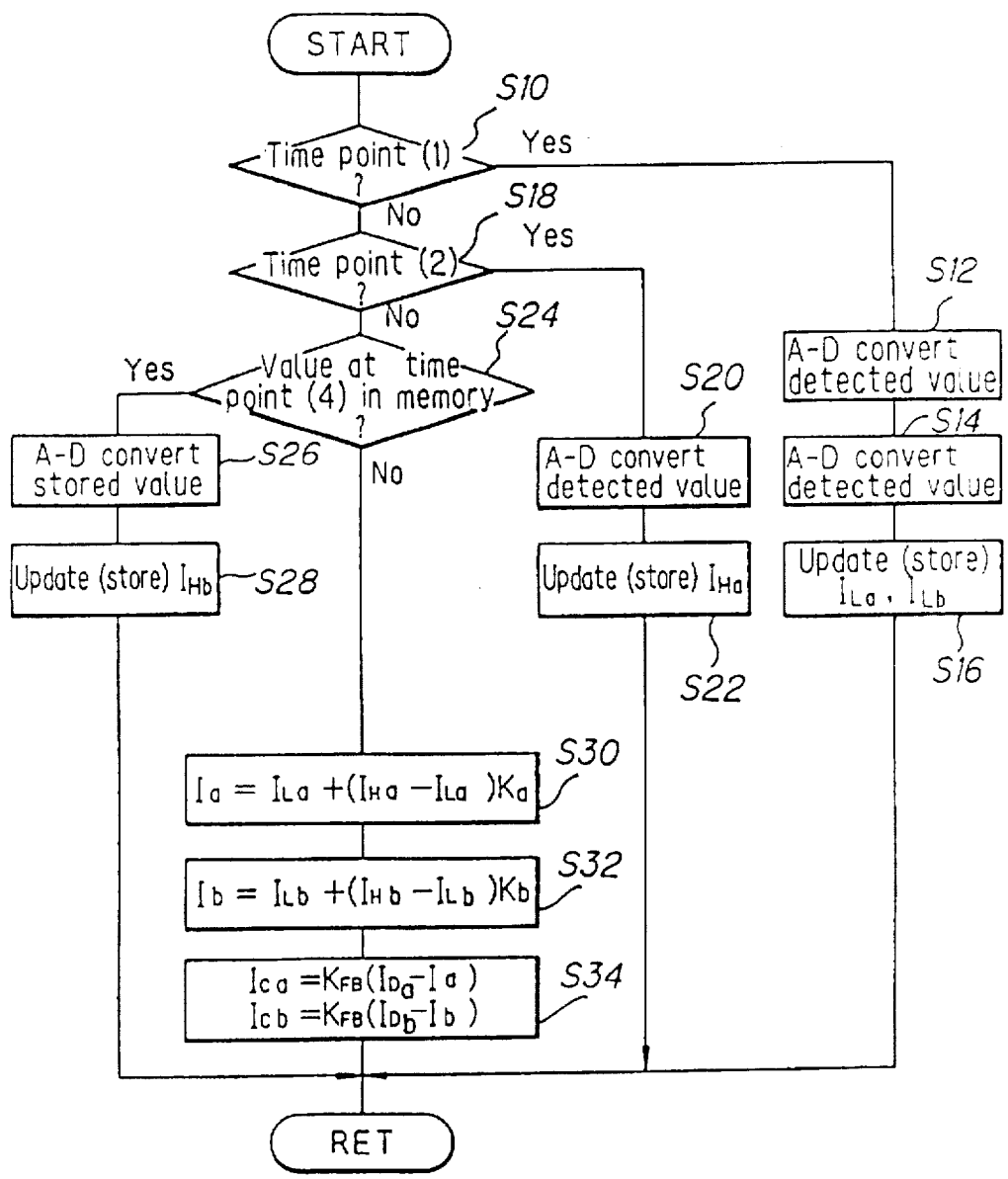
FIG. 5 is a flowchart showing a subroutine of the flowchart of FIG. 3.

FIG. 5 is a subroutine flowchart showing the current detection. The routine of the flowchart of FIG. 5 is activated at prescribed intervals.

Figure 6:
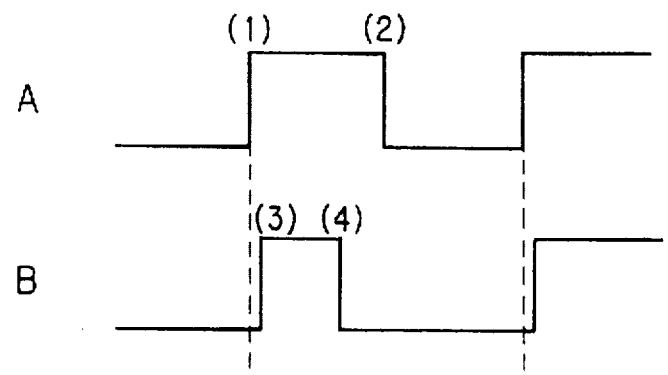
FIG. 6 is a timing chart explaining the procedures illustrated in the flowchart of FIG. 5.

Explaining the flowchart referring to the timing chart of FIG. 6, first in S10, it is checked whether it is the time at which the pulse A is at the rise point (leading edge), i.e., the point (1) shown in FIG. 6. Since the CPU 17 determines the drive duty pulse (command) (duty ratio), it can by itself ascertain whether the drive duty pulse is at the rise point.

Figure 7:
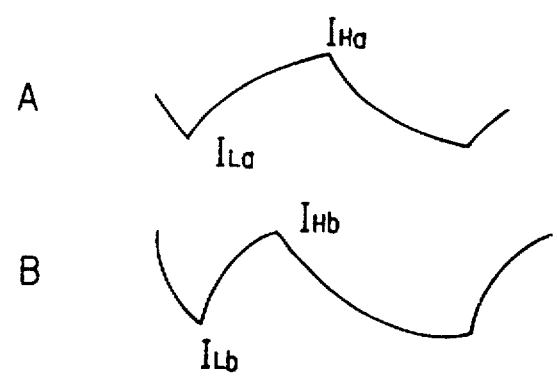
FIG. 7 is a view explaining the procedures illustrated in the flowchart of FIG. 5.

When S10 finds that the drive duty pulse is at the rise point, the program goes to S12, in which the input value (output of filter circuit 24) detected at that point is A-D converted (more precisely, fetched and A-D converted), and the converted value is defined as a minimum value $I_{La}$, as shown in FIG. 7. The program then goes to S14 in which the input value detected at the point (3) is A-D converted for the pulse B and is defined as a minimum value $I_{Lb}$ since the order of conversion is configured to be successive. The program next proceeds to S16 in which the converted values are updated (or stored), whereafter the routine is once terminated.

In the next and following routine cycles (program loops), when the result in S10 is NO, the program goes to S18, in which it is checked whether the pulse A is at the fall point (trailing edge) (2) shown in FIG. 6. When the result is YES, the program goes to S20 in which the detected value is A-D converted (the converted value is defined as a maximum value $I_{Ha}$), and to S22 in which the converted value is updated (or stored), whereafter the routine is once terminated.

In the next and following routine cycles, when the results in S10 and S18 are NO, the program goes to 524 in which it is checked whether the value detected at the time (4) (shown in FIG. 6) already has been stored in the voltage memory circuit 25 in terms of voltage. When the result is YES, the program goes to S26 in which the stored value is A-D converted, and to S28 in which the converted value is transformed into a value indicating the current value in accordance with an appropriate characteristic, and the converted value is updated (or stored) as $I_{Hb}$.

On the other hand, when the result in S24 is NO, the program goes to S30 in which the current Ia for the pulse A is calculated by an equation given there, and to S32 in which the current Ib for the pulse B is calculated by a similar equation shown there. Here, Ka, Kb are coefficients which are determined based on at least the duty ratio. Since the current detection itself is not the gist of the invention and is disclosed in Japanese Patent Application No. Hei 7(1995)-68761 filed by the assignee, no further explanation is made here.

The program then proceeds to S34 in which the detected values Ia, Ib are converted to current values in accordance with an appropriate conversion table as referred to earlier and the control errors between the converted and command values $I_{Da}$, $I_{Db}$ are respectively calculated and the results are multiplied by feedback gain (coefficient) $K_{FB}$ based on a PID control law to obtain command values $I_{Ca}$, $I_{Cb}$. The command values are output to the linear solenoids SL3, SL4 through another routine not shown in the drawings.

Figure 4:
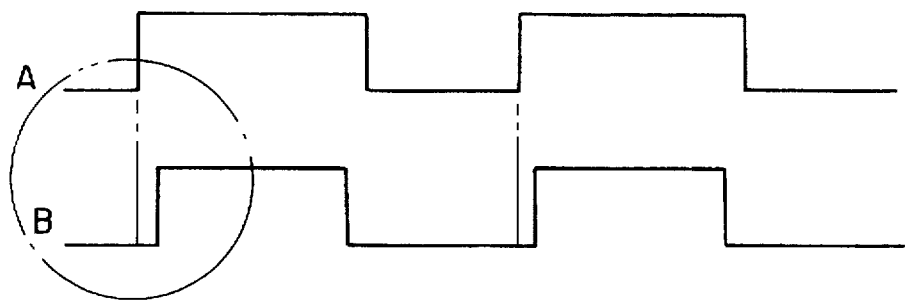
FIG. 4a and 4b are timing charts explaining the procedures illustrated in the flowchart of FIG. 3 where
Figure 4:
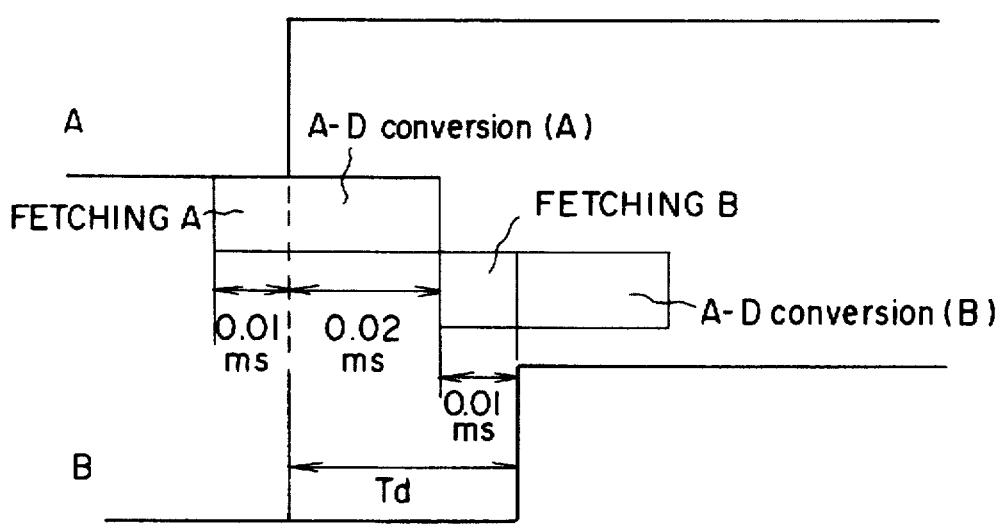
Figure 8:
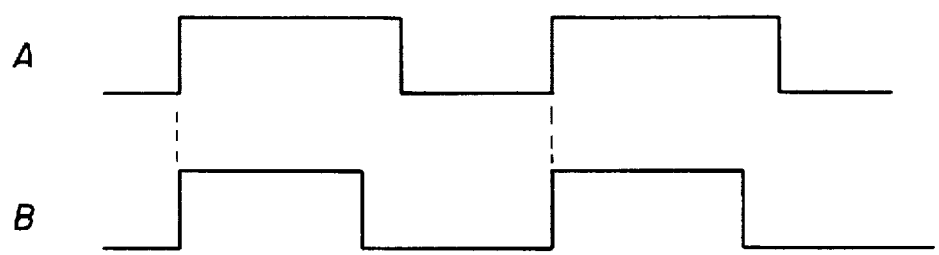
FIG. 8 is a timing chart showing pulse trains of duty ratios in the PWM control in the prior art to be applied in the electronic device such as a linear solenoid.

As can be seen from the foregoing, in this embodiment, the system is provided with a microcomputer having a single A-D converter and is configured to have two linear solenoids SL3, SL4 driven by the trains of pulses A, B. In the system, the rise point (leading edge) of one pulse B is shifted from that of the other pulse A by the time required for A-D conversion, as shown in FIG. 4, which is in contrast with the configuration illustrated in FIG. 8. With the arrangement, by conducting the A-D conversion successively for the two pulses A, B, it becomes possible to detect the current at four points with the use of only one voltage memory circuit.

Moreover, since the A-D conversion for the pulse B is carried out automatically, the activation of A-D conversion for the pulse B is no longer needed. The arrangement decreases the volume of processing in software and causes the A-D conversion to be simpler. In other words, when the current is to be detected at the rise and fall points of the pulse, reading or fetching of the detected value should be completed immediately after the respective point, which otherwise would cause the detection to be erroneous. If not configured as in the foregoing, therefore, the system would additionally require one more voltage memory circuit and complicated processing software.

While the pulses A, B are shifted by the amount Td of 0.03 ms that is equal to a time required for one A-D conversion, this is not limitative. The time may alternatively be an integer multiple of the time such as twice or be a real number multiple. Simply saying this, it suffices if the amount Td is determined with reference to the time required for A-D conversion.

While the foregoing description is made taking a linear solenoid as an example of an electronic device, this is not limitative. Although the linear solenoid used as an example is a linear solenoid used in a hydraulically operated vehicle transmission, the invention is not limited to this disclosed application.

Although the invention has thus been shown and described with reference to specific embodiments, it should be noted that the invention is in no way limited to the details of the described arrangements, changes and modifications may be made without departing from the scope of the invention, which is defined by the appended claims.

What is claimed is:

1. An improved pulse-width modulation control system, comprising:

a power source;

driver circuits each connected to the power source;

at least two solenoids each connected to the power source through one of the driver circuits;

pulse supplying means for supplying a first command pulse train A and a second pulse train B each having a duty ratio to the driver circuits to cause the driver circuits to supply a current to each of the solenoids from the power source in response to the first and second command pulse trains;

current detecting means for detecting an analog value indicative of the currents supplied to each of the two solenoids, respectively;

a voltage memory circuit for storing the detected analog value detected by said current detecting means;

correcting means for correcting at least one of said first and second command pulse trains A, B based on a result obtained by comparing the detected current with the current value corresponding to said command pulse trains; and a single A/D converter for A/D converting the detected analog values wherein the improvement comprises:

time lag setting means for setting a time lag Td between a leading edge of the first command pulse train A and a leading edge of the second command pulse train B; and A/D conversion conducting means for determining a time point corresponding to the leading edge of the first command pulse train such that said A/D converter A/D successively converts the detected value at the leading edges of the first and second command pulse trains A, B.

2. A system according to claim 1, wherein said time lag is determined based on a time which said A/D converter requires for the A/D conversion.

3. A system according to claim 2, wherein said A/D conversion conducting means includes:

first time point determining means for detecting a first time point which corresponds to the leading edge of the first command pulse train and which corresponds said A/D converter to A/D convert the detected analog value to obtain a digital value IIa, and which causes said A/D converter to successively A/D convert the detected analog value at a second time point which lags behind said first time point by said time lag Td and which corresponds to a leading edge of the second command pulse train to obtain a digital value IIb;

third time point detecting means for detecting a third time point which corresponds to a trailing edge of one of the first command pulse train and the second command pulse train which causes said A/D converter to A/D convert the detected analog value to obtain a digital value Iha; and fourth time point detecting means for detecting whether or not the detected analog value is stored in said voltage memory circuit detected at a fourth time point corresponding to a trailing edge of the other of the first command pulse train and the second command pulse train and, if so, causing said A/D converter to A/D convert the stored analog value at the fourth time point to obtain a digital value Ihb.

4. A system according to claim 1, wherein said A/D conversion conducting means comprises:

first time point detecting means for determining a first time which corresponds to the leading edge of the first command pulse train and which causes said A/D converter to A/D convert the detected analog value to obtain a digital value IIa, and which causes said A/D converter to successively A/D convert the detected analog value at a second time point which lags behind said first time point by said time lag Td and which corresponds to a leading edge of the second command pulse train to obtain a digital value IIb;

third time point detecting means for detecting a third time point which corresponds to a trailing edge of one of the first command pulse train and the second command pulse train and causing said A/D converter to A/D convert the detected analog value to obtain a digital value IHa; and fourth time point detecting means for detecting whether or not a detected analog value is stored in said voltage memory circuit at a fourth time point corresponding to a trailing edge of the other of the first command pulse train and the second command pulse train and, if so, which causes said A/D converter to A/D convert the stored analog value at the fourth time point to obtain a digital value IHb.

* * * * *